US009509741B2

(12) United States Patent
Barjonas et al.

(10) Patent No.: US 9,509,741 B2
(45) Date of Patent: Nov. 29, 2016

(54) SNAPSHOT CAPTURE FOR A COMMUNICATION SESSION

(71) Applicant: Microsoft Technology Licensing, LLC, Redmond, WA (US)

(72) Inventors: Hamish Rory Barjonas, Bellevue, WA (US); Simon Lucas, Redhill (GB); Carl David Blundell, Cardiff (GB); Mark Christopher Wass, Chelmsford (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/683,819

(22) Filed: Apr. 10, 2015

(65) Prior Publication Data

US 2016/0301727 A1 Oct. 13, 2016

(51) Int. Cl.
| | | |
|---|---|---|
| *H04N 7/15* | (2006.01) | |
| *H04L 29/06* | (2006.01) | |
| *G06T 7/00* | (2006.01) | |
| *G06K 9/00* | (2006.01) | |

(52) U.S. Cl.
CPC ......... *H04L 65/601* (2013.01); *G06K 9/00275* (2013.01); *G06T 7/0002* (2013.01); *H04L 65/1083* (2013.01); *H04L 65/403* (2013.01); *H04L 65/80* (2013.01); *H04N 7/15* (2013.01)

(58) Field of Classification Search
USPC ...................................................... 348/14.07
See application file for complete search history.

(56) References Cited

U.S. PATENT DOCUMENTS

| | | |
|---|---|---|
| 5,818,439 A | 10/1998 | Nagasaka et al. |
| 6,139,197 A | 10/2000 | Banks |
| 7,184,602 B2 | 2/2007 | Cohen et al. |
| 7,876,978 B2 | 1/2011 | Berger et al. |
| 8,199,249 B2 | 6/2012 | Ciudad et al. |
| 8,325,213 B2 | 12/2012 | Lamb et al. |
| 8,331,618 B1 | 12/2012 | Yung et al. |
| 2004/0252977 A1 | 12/2004 | Batrouny et al. |

(Continued)

FOREIGN PATENT DOCUMENTS

| | | |
|---|---|---|
| CN | 103942525 | 7/2014 |
| JP | 2006303897 | 11/2006 |

(Continued)

OTHER PUBLICATIONS

Pardhy,"Zeallsoft Super Webcam Recorder", Retrieved From: <http://zeallsoft-super-webcam-recorder.software.informer.com/> Apr. 9, 2015, Mar. 9, 2009, 2 pages.

(Continued)

*Primary Examiner* — Creighton Smith
(74) *Attorney, Agent, or Firm* — Tom Wong; Micky Minhas

(57) ABSTRACT

Techniques for snapshot capture for a communication session are described. According to various embodiments, a communication session is established that includes a video feed that is streamed between devices involved in the communication session. The video feed is sampled to extract still images (e.g., frames) from the video feed that include images of a particular participant in the communication session. A snapshot is then selected from the images based on one or more selection criteria, such as an image score for the snapshot. Should a quality of the video feed fall below an acceptable video quality threshold during the communication session, the snapshot is used in place of the video feed for a visual representation of the participant during the communication session.

20 Claims, 10 Drawing Sheets

(56) References Cited

U.S. PATENT DOCUMENTS

| | | | |
|---|---|---|---|
| 2007/0132874 A1* | 6/2007 | Forman | H04N 5/23212 |
| | | | 348/333.02 |
| 2007/0211141 A1* | 9/2007 | Christiansen | H04L 29/06027 |
| | | | 348/14.08 |
| 2008/0260255 A1* | 10/2008 | Fukushima | G06F 17/30259 |
| | | | 382/190 |
| 2009/0138906 A1 | 5/2009 | Eide et al. | |
| 2012/0069028 A1 | 3/2012 | Bouguerra | |
| 2013/0283330 A1 | 10/2013 | Hengeveld | |
| 2013/0287307 A1* | 10/2013 | Omer | G06K 9/68 |
| | | | 382/218 |
| 2014/0327730 A1 | 11/2014 | Wiener et al. | |
| 2015/0139497 A1* | 5/2015 | Juveneton | G06K 9/00906 |
| | | | 382/103 |
| 2015/0201161 A1* | 7/2015 | Lachapelle | H04N 7/15 |
| | | | 348/14.07 |
| 2015/0222919 A1* | 8/2015 | Licata | H04N 19/521 |
| | | | 375/240.16 |
| 2015/0324644 A1* | 11/2015 | Meredith | G06K 9/00577 |
| | | | 382/181 |
| 2015/0379557 A1* | 12/2015 | Liu | G06Q 30/0244 |
| | | | 705/14.43 |

FOREIGN PATENT DOCUMENTS

| | | |
|---|---|---|
| JP | 2008211660 | 9/2008 |
| WO | WO-2014146100 | 9/2014 |

OTHER PUBLICATIONS

International Search Report and Written Opinion, Application No. PCT/US2016/026635, Jun. 21, 2016, 14 pages.

Ma, "Video Snapshot: A Bird View of Video Sequence", 11th International Multimedia Modelling Conference, Jan. 2005, 8 pages.

* cited by examiner

US 9,509,741 B2

SNAPSHOT CAPTURE FOR A COMMUNICATION SESSION

BACKGROUND

Modern communication systems have an array of capabilities, including integration of various communication modalities with different services. For example, instant messaging, voice/video communications, data/application sharing, white-boarding, and other forms of communication may be combined with presence and availability information for subscribers. Such systems may provide subscribers with the enhanced capabilities such as providing instructions to callers for various status categories, alternate contacts, calendar information, and comparable features. Furthermore, collaboration systems enabling users to share and collaborate in creating and modifying various types of documents and content may be integrated with multimodal communication systems providing different kinds of communication and collaboration capabilities. Such integrated systems are sometimes referred to as Unified Communication and Collaboration (UC&C) systems.

While UC&C systems provide for increased flexibility in communications, they also present a number of implementation challenges. For instance, a UC&C system typically utilizes multiple interconnected networks to route various communications. Since different networks may be managed by different entities, challenges thus arise in managing communications quality for communications that are routed among independently managed networks. Thus, techniques for managing UC&C communication traffic typically have to be fluid and dynamic to accommodate changing connection scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for snapshot capture for a communication session are described. According to various embodiments, a communication session is established that includes a video feed that is streamed between devices involved in the communication session. The video feed is sampled to extract still images (e.g., frames) from the video feed that include images of a particular participant in the communication session. A snapshot is then selected from the images based on one or more selection criteria, such as an image score for the snapshot. Should a quality of the video feed fall below an acceptable video quality threshold during the communication session, the snapshot is used in place of the video feed for a visual representation of the participant during the communication session.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for snapshot capture for a communication session are described. In at least some implementations, a communication session refers to a real-time exchange of communication media between different communication endpoints. Examples of a communication session include a Voice over Internet Protocol (VoIP) call, a video call, text messaging, a file transfer, content sharing, and/or combinations thereof. In at least some embodiments, a communication session represents a Unified Communication and Collaboration (UC&C) session.

According to various implementations, a communication session is established that includes a video feed that is streamed between devices involved in the communication session. The video feed, for example, includes video images of participants in the communication session. The video feed is sampled to extract still images (e.g., frames) from the video feed that include images of a particular participant and/or set of participants. The images are scored based on a number of scoring criteria, such as a quality of the images, attributes of a face image detected in the images, an age of the images, and so forth. A snapshot is then selected from the scored images. For instance, an image with a highest image score is selected for the snapshot. Should a quality of the video feed fall below an acceptable video quality threshold during the communication session, the snapshot is used in place of the video feed for a visual representation of the participant during the communication session.

Accordingly, techniques described herein enable images to be sampled from a video feed of a communication session, scored to generate scored images, and a snapshot selected from the scored images automatically and independent of user interaction. Thus, participants in the communication session are not required to manually capture a snapshot and may focus on participating in the communication session. Further, snapshot quality is increased by selecting a snapshot that satisfies various quality-related criteria.

In the following discussion, an example environment is first described that is operable to employ techniques described herein. Next, a section entitled "Example Implementation Scenario" describes an example implementation scenario in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

Figure 1:
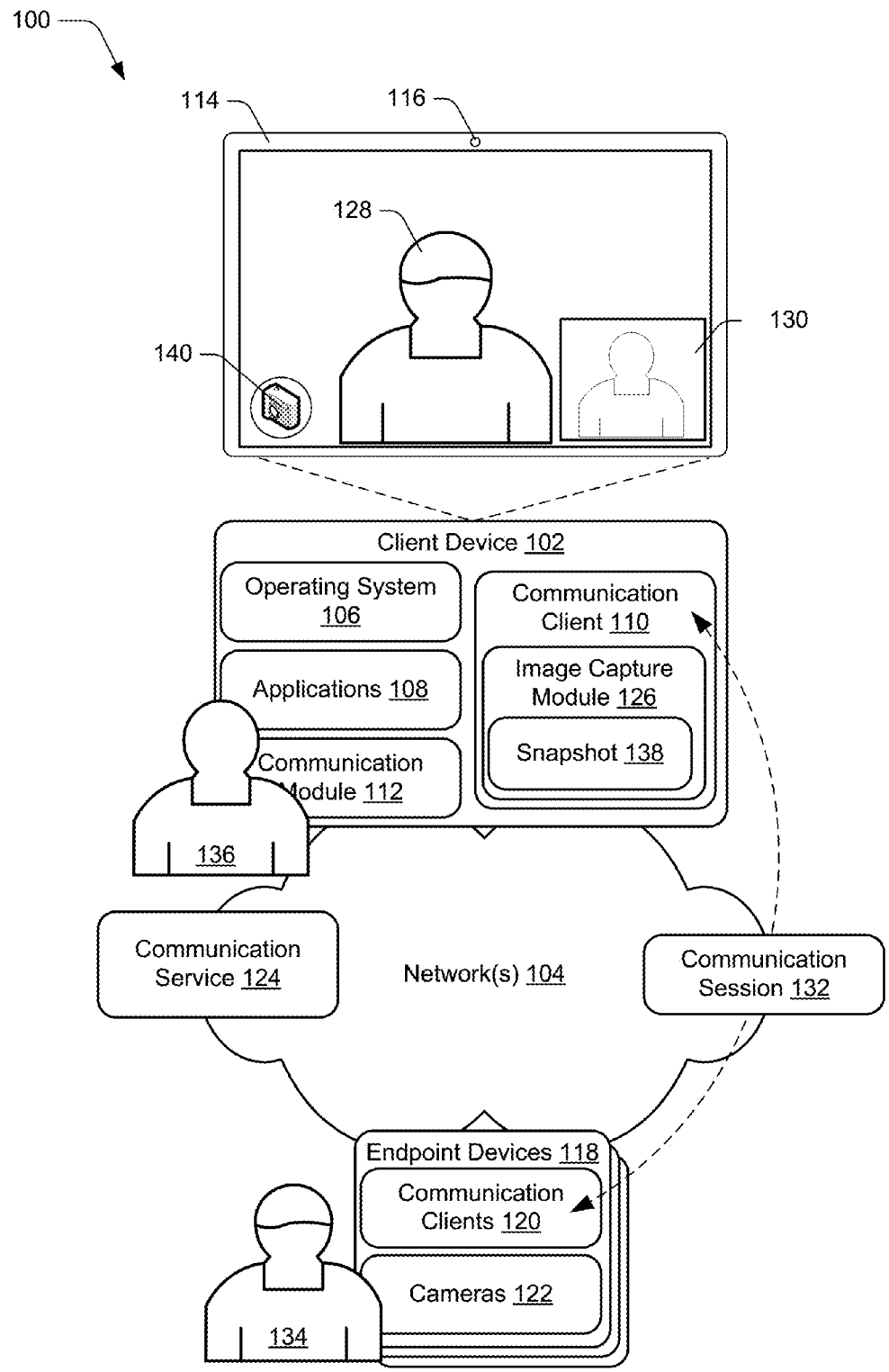
FIG. 1 is an illustration of an environment in an example implementation that is operable to employ techniques discussed herein.

FIG. 1 is an illustration of an environment 100 in an example implementation that is operable to employ techniques for snapshot capture for a communication session described herein. Generally, the environment 100 includes various devices, services, and networks that enable communication via a variety of different modalities. For instance, the environment 100 includes a client device 102 connected to a network 104. The client device 102 may be configured in a variety of ways, such as a traditional computer (e.g., a desktop personal computer, laptop computer, and so on), a mobile station, an entertainment appliance, a smartphone, a wearable device, a netbook, a game console, a handheld device (e.g., a tablet), and so forth.

The network 104 is representative of a network that provides the client device 102 with connectivity to various networks and/or services, such as the Internet. The network 104 may provide the client device 102 with connectivity via a variety of different connectivity technologies, such as broadband cable, digital subscriber line (DSL), wireless cellular, wireless data connectivity (e.g., WiFi™), T-carrier (e.g., T1), Ethernet, and so forth. In at least some implementations, the network 104 represents different interconnected wired and wireless networks.

The client device 102 includes a variety of different functionalities that enable various activities and tasks to be performed. For instance, the client device 102 includes an operating system 106, applications 108, a communication client 110, and a communication module 112. Generally, the operating system 106 is representative of functionality for abstracting various system components of the client device 102, such as hardware, kernel-level modules and services, and so forth. The operating system 106, for instance, can abstract various components of the client device 102 to the applications 108 to enable interaction between the components and the applications 108.

The applications 108 represent functionalities for performing different tasks via the client device 102. Examples of the applications 108 include a word processing application, a spreadsheet application, a web browser, a gaming application, and so forth. The applications 108 may be installed locally on the client device 102 to be executed via a local runtime environment, and/or may represent portals to remote functionality, such as cloud-based services, web apps, and so forth. Thus, the applications 108 may take a variety of forms, such as locally-executed code, portals to remotely hosted services, and so forth.

The communication client 110 is representative of functionality to enable different forms of communication via the client device 102. Examples of the communication client 110 include a voice communication application (e.g., a VoIP client), a video communication application, a messaging application, a content sharing application, a unified communication & collaboration (UC&C) application, and combinations thereof. The communication client 110, for instance, enables different communication modalities to be combined to provide diverse communication scenarios.

The communication module 112 is representative of functionality for enabling the client device 102 to communicate data over wired and/or wireless connections. For instance, the communication module 112 represents hardware and logic for data communication via a variety of different wired and/or wireless technologies and protocols.

The client device 102 further includes a display device 114 and a camera 116. The display device 114 generally represents functionality for visual output for the client device 102. Additionally, the display device 114 represents functionality for receiving various types of input, such as touch input, pen input, and so forth.

The camera 116 is representative of functionality to capture and record visual images, such as still images, video, and so on. The camera 116 includes various image capture components, such as apertures, lenses, mirrors, prisms, electronic image sensors, and so on.

The environment 100 further includes endpoint devices 118, which are representative of devices and/or functionalities with which the client device 102 may communicate. In at least some implementations, the endpoint devices 118 represent end-user devices such as discussed with reference to the client device 102. The endpoint devices 118 include communication clients 120 and cameras 122. The communication clients 120 are representative of functionalities to enable different forms of communication via the endpoint devices 118. The communication clients 120, for example, represent different instances of the communication client 110. For purposes of discussion herein, reference is made to an endpoint device 118 and a communication client 120, which represent instances of the endpoint devices 118 and the communication clients 120, respectively.

The cameras 122 represent functionalities for capturing images (e.g., video and still images) at the endpoint devices 118, such as for streaming to the client device 102 as part of a communication session.

In at least some implementations, the communication clients 110, 120 represent interfaces to a communication service 124. Generally, the communication service 124 is representative of a service to perform various tasks for management of communication between the client device 102 and the endpoint device 118. The communication service 124, for instance, can manage initiation, moderation, and termination of communication sessions between the communication clients 110, 120.

The communication service 124 maintains a presence across many different networks and can be implemented according to a variety of different architectures, such as a cloud-based service, a distributed service, a web-based service, and so forth. Examples of the communication service 124 include a VoIP service, an online conferencing service, a UC&C service, and so forth.

The communication client 110 further includes an image capture module 126, which is representative of functionality for performing various aspects of techniques for snapshot capture for a communication session discussed herein. Various attributes and operational aspects of the image capture module 126 are detailed below. Further, while the image capture module 126 is depicted as being implemented on the client device 102, it is to be appreciated that in some additional or alternative implementations, functionality of the image capture module 126 may be partially or wholly implemented via a network-based service, such as the communication service 124. For instance, the communication service 124 may capture and select snapshots according to techniques discussed herein, and may provide the snapshots to devices involved in communication sessions.

Displayed on the display device 114 is a primary visual 128 and a secondary visual 130, which represent visuals that are displayed as part of a communication session 132 between the communication client 110 of the client device 102 and the communication client 120 of the endpoint device 118. The communication session 132, for instance, represents a real-time exchange of voice and video between the client device 102 and the endpoint device 118. In this particular example, the primary visual 128 represents an image of a user 134 of the endpoint device 118, and the secondary visual 130 represents a user 136 of the client device 102. While not illustrated in this particular example, the endpoint device 118 may also display the primary visual 128 and the secondary visual 130, but with their positions reversed. For instance, at the endpoint device 118, the secondary visual 130 represents a primary visual, and the primary visual 128 represents a secondary visual.

According to various implementations, graphics for the primary visual 128 and/or the secondary visual 130 may be generated in various ways. For instance, a real-time video feed can be captured via the camera 116 and streamed to the endpoint device 118. Alternatively, a particular visual may include a static image, such as an avatar and/or snapshot that represents a particular user. As further detailed below, techniques for snapshot capture for a communication session discussed herein may be employed to capture and store a snapshot 138 of the user 134 that meets an acceptable quality threshold and that can be used in place of a live video feed from the endpoint device 118. For instance, when the quality of a live video feed from the endpoint device 118 for the communication session 132 is degraded, the snapshot 138 is displayed on the display device 114 to replace the live video feed. Alternatively or additionally, the user 136 may select a snapshot control 140 to manually capture the snapshot 138. In at least some implementations, a manually captured snapshot 138 is given preference over an automatically captured snapshot. Further details and implementations for snapshot capture for a communication session are provided below.

Having described an example environment in which the techniques described herein may operate, consider now a discussion of an example implementation scenario for snapshot capture for a communication session in accordance with one or more embodiments.

Example Implementation Scenario

The following section describes an example implementation scenario for snapshot capture for a communication session in accordance with one or more implementations. The implementation scenario may be implemented in the environment 100 discussed above, and/or any other suitable environment.

Figure 2:
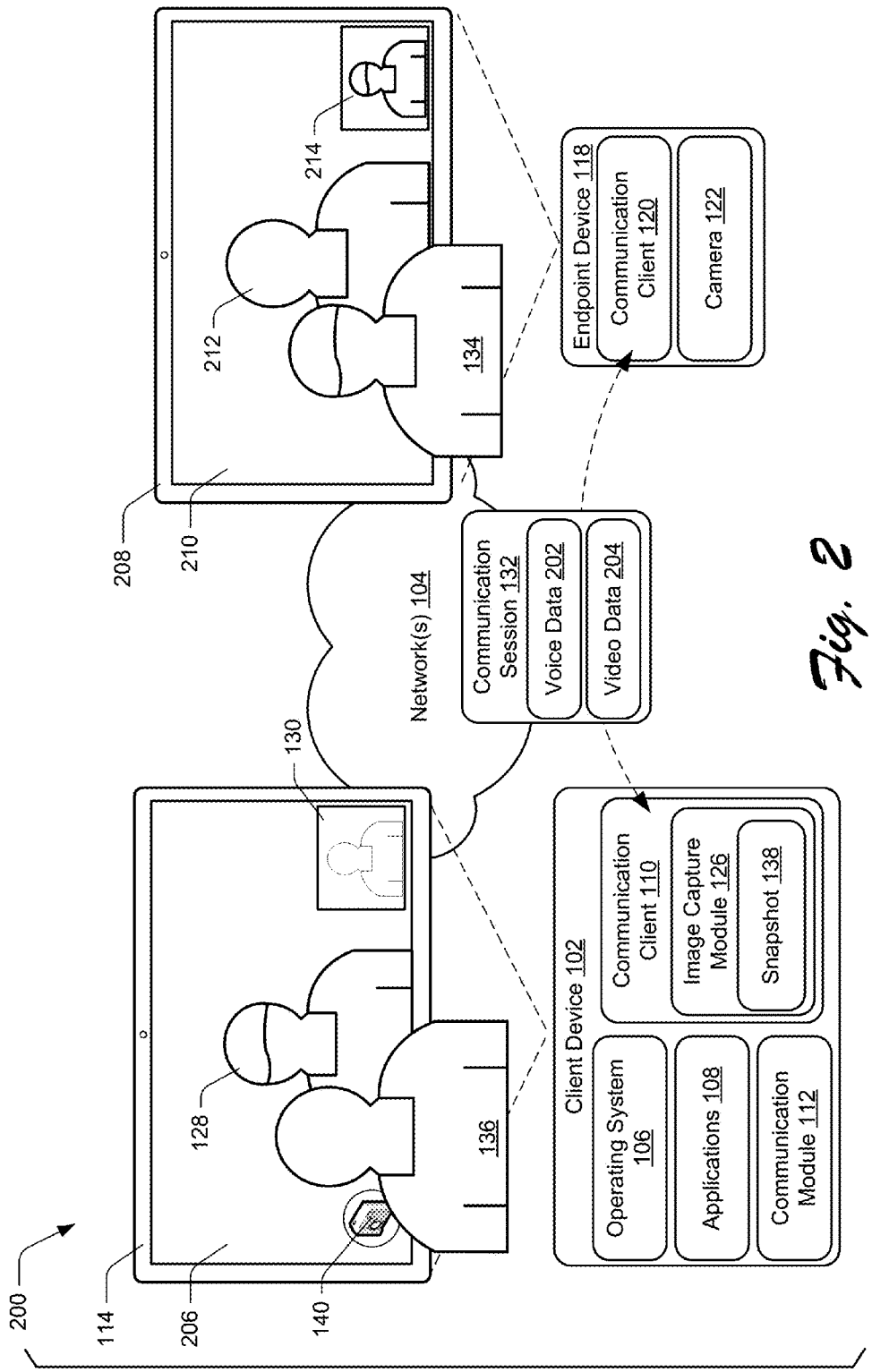
FIG. 2 illustrates an example implementation scenario for snapshot capture for a communication session in accordance with one or more embodiments.

FIG. 2 depicts an example implementation scenario 200 for capturing a snapshot of a participant in a communication session in accordance with one or more implementations. The scenario 200 includes various entities and components introduced above with reference to the environment 100.

In the scenario 200, the user 136 is engaged in the communication session 132 with the user 134. Generally, the communication session 132 represents an exchange of different communication media between the client device 102 and the endpoint device 118, such as audio, video, files, media content, and/or combinations thereof. In this particular example, the communication session 132 involves a real-time exchange of voice data 202 and video data 204 between the client device 102 and the endpoint device 118 over the network 104.

As part of the communication session 132, the display device 114 displays a communications graphical user interface (GUI) 206, which represents a GUI for the communication client 110. Displayed within the communications GUI 206 are the primary visual 128 and the secondary visual 130. As referenced above, the primary visual 128 is a visual representation of the user 134, and the secondary visual 130 is a visual representation of the user 136.

The scenario 200 further includes a display device 208, which represents a display for the endpoint device 118. Displayed on the display device 208 is a communications GUI 210, which represents a GUI for the communication client 120. Presented within the communications GUI 210 is a primary visual 212 and a secondary visual 214. The primary visual 212 is a visual representation of the user 136, and the secondary visual 214 is a visual representation of the user 134. Generally, the communications GUIs 206, 210 enable visual interaction between the users 134, 136 as part of the communication session 132.

According to various implementations, the different visuals displayed on the display devices 114, 208 represent real-time video captured at the respective devices. However, in some scenarios the quality of the video data 204 available for rendering video on a particular display device may be degraded to such an extent that the video is replaced with a still image (a "snapshot") of a particular user.

Consider, for example, that while the communication session 132 is in progress, the client device 102 captures snapshots of the user 134 from the incoming video data 204 that is displayed as the primary visual 128. For instance, the image capture module 126 captures individual frames of the video data 204 streamed to the client device 102 from the endpoint device 118. As further detailed below, the image capture module 126 captures multiple snapshots of the user 134 during the communication session 132, and selects a best candidate image to be used for the snapshot 138. The snapshot 138, for instance, represents a snapshot that meets a certain quality threshold and/or that has a higher quality score than other snapshots that are captured. Further, the image capture module periodically and/or continuously captures frames of the video data 204 while the communication session 132 is in progress, and can update the snapshot 138 when higher quality images are detected. Thus, the snapshot 138 is dynamically selectable from the video data 204 while the communication session 132 is in progress.

In at least some implementations, the user 136 may select the snapshot control 140 to manually capture the snapshot 138 from the video data 204. In such implementations, the manually captured snapshot is given preference over an automatically captured snapshot. Further, selecting the snapshot control 140 may terminate the automatic snapshot capture processes discussed herein such that the manually captured snapshot 138 is utilized for the remainder of the communication session 132.

Accordingly, in a scenario where quality of the incoming video stream from the endpoint device 118 falls below a certain quality threshold, the client device 102 utilizes the snapshot 138 for the primary visual 128 in place of the video stream. The image capture module 126, for example, replaces the incoming video data 204 with the snapshot 138 for the primary visual 128. If the quality of the video data 204 subsequently improves to an acceptable quality level, the snapshot 138 is then replaced with the live video data 204 for the primary visual 128.

Having discussed an example implementation scenario, consider now a discussion of some example procedures in accordance with one or more embodiments.

Example Procedures

The following discussion describes some example procedures for snapshot capture for a communication session in accordance with one or more embodiments. The example procedures may be employed in the environment 100 of FIG. 1, the system 1000 of FIG. 10, and/or any other suitable environment. The procedures, for instance, represent example procedures for implementing the implementation scenario described above. In at least some implementations, the steps described for the various procedures are implemented automatically and independent of user interaction. According to various implementations, the procedures may be performed locally (e.g., at the client device 102) and/or at a network-based service, such as the communication service 124.

Figure 3:
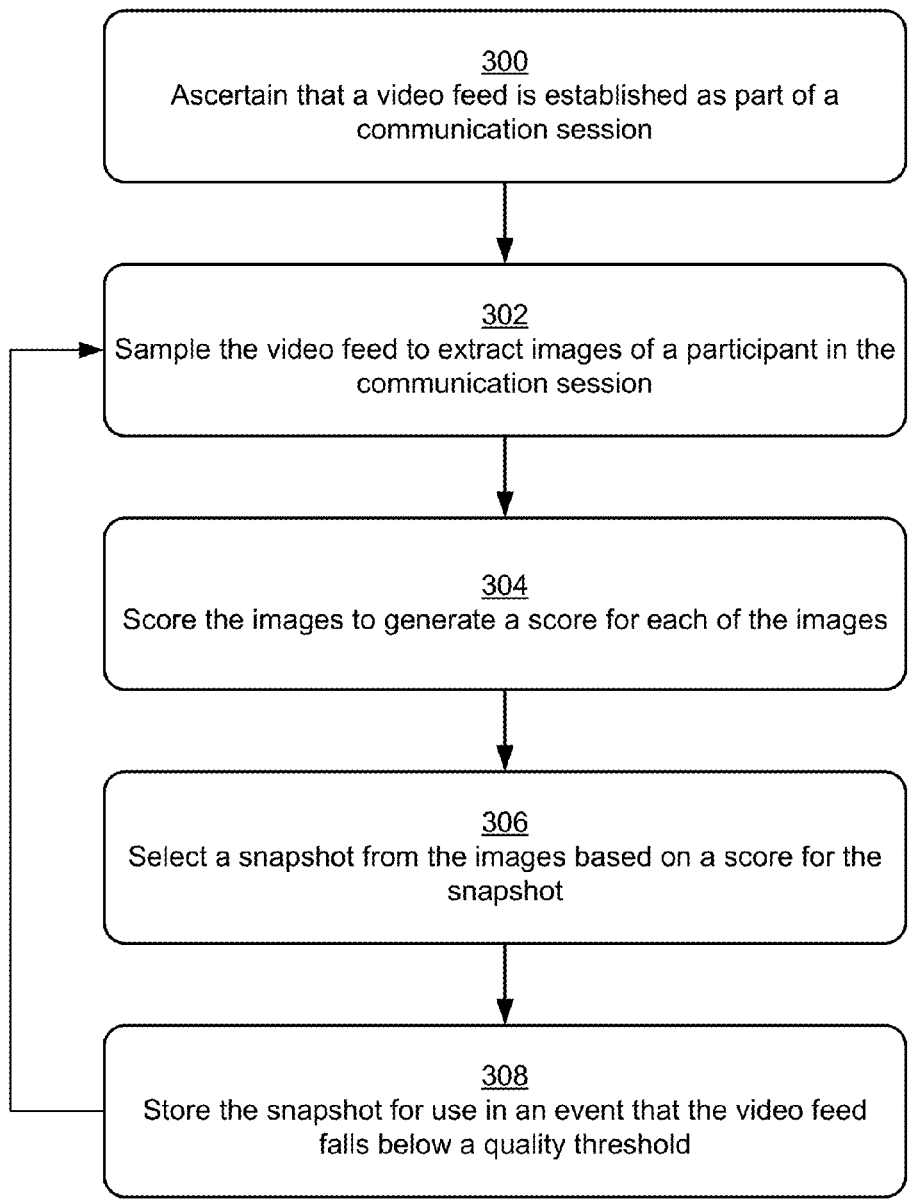
FIG. 3 is a flow diagram that describes steps in a method for selecting a snapshot for use during a communication session in accordance with one or more embodiments.

FIG. 3 is a flow diagram that describes steps in a method in accordance with one or more implementations. The method describes an example procedure for selecting a snapshot for use during a communication session in accordance with one or more implementations. In at least some implementations, the method may be performed at least in part at the client device 102 (e.g., by the image capture module 126) and/or by the communication service 124.

Step 300 ascertains that a video feed is established as part of a communication session. The image capture module 126, for example, ascertains that the communication session 132 is established between the client device 102 and the endpoint device 118. In at least some implementations, the communication client 110 notifies the image capture module 126 that the communication session 132 is initiated and that a video feed is established as part of the communication session 132. The video feed, for instance, represents real-time video that is displayed on the display device 114 as part of the primary image 128.

Step 302 samples the video feed to extract images of a participant in the communication session. For example, the image capture module 126 samples the incoming video data 204 from the endpoint device 118 to extract images (e.g., frames, still images, and so forth) that include the user 134.

In at least some implementations, the video feed is sampled at a predefined interval to extract images, e.g., every 0.5 seconds ("s"), every 1 s, every 3 s, and so forth. Alternatively, the video feed is sampled at a time interval that is variable based on various criteria. For instance, if the video feed is received over a communication channel that is known to have quality problems, the sampling rate may be increased in anticipation of a likely need for a snapshot to replace the video feed. In another example, if power (e.g., battery) and/or processing resources on a receiving device are limited, such as in a mobile scenario, a sampling rate may be decreased to conserve power and/or processing resources. Thus, in at least some implementations, a sampling rate is dynamically variable based on different sampling criteria.

Step 304 scores the images to generate a score for each of the images. The image capture module 126, for example, applies different scoring criteria to the images to generate a score for each image. Generally, a score provides a relative indication of a suitability of a particular image to be used for a snapshot. Different ways of scoring an image are detailed below.

Step 306 selects a snapshot from the images based on a score for the snapshot. The image capture module 126, for example, selects an image with the highest score to be used for the snapshot 138. In at least some implementations, a timestamp is stored for the snapshot that indicates when the image for the snapshot was received as part of a video feed and/or when the snapshot was selected from a scored group of images.

Step 308 stores the snapshot for use in an event that the video feed falls below a quality threshold. For instance, the image capture module 126 stores the snapshot 138 in memory and/or storage, and can provide the snapshot 138 to the communication client 110 should the video feed for the communication session 132 fall below a quality threshold.

As illustrated, the process returns to step 302 such that the video feed continues to be sampled to extract images, score the images, and select snapshots based on scores for the images. For instance, when a new image is scored higher than a current snapshot, the new image is used as a new snapshot to replace the current snapshot. In at least some implementations, this process occurs periodically and/or continuously while the communication session is active, thus enabling a snapshot for the communication session to be dynamically updated.

Figure 4:
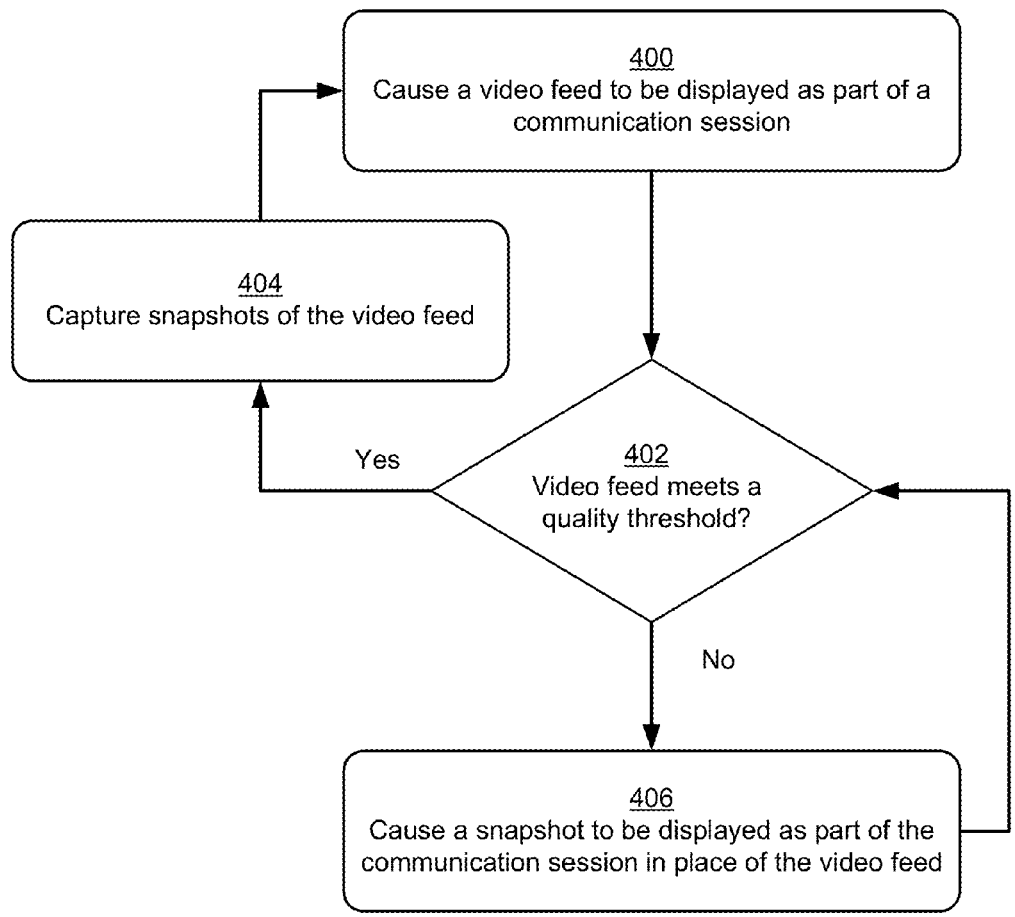
FIG. 4 is a flow diagram that describes steps in a method for causing a snapshot to be used during a communication session in accordance with one or more embodiments.

FIG. 4 is a flow diagram that describes steps in a method in accordance with one or more implementations. The method describes an example procedure for causing a snapshot to be used during a communication session in accordance with one or more implementations. The method, for example, represents a continuation of the method described above with reference to FIG. 3. In at least some implementations, the method may be performed at least in part at the client device 102 (e.g., by the image capture module 126) and/or by the communication service 124.

Step 400 causes a video feed to be displayed as part of a communication session. The communication client 110, for example, causes at least some of the video data 204 to be displayed on the display device 114 as part of the communication session 132.

Step 402 ascertains whether the video feed for the communication session meets a quality threshold. Generally, the quality threshold may be defined in various ways, such as a minimum resolution for the video data of the video feed, a minimum frame rate, a maximum error rate in the video data, a minimum signal-to-noise ratio in the video data, and so forth. A video feed may also fail to meet the quality threshold if the video feed drops or is terminated during the communication session, and/or if the communication session is dropped.

If the video feed meets the quality threshold ("Yes"), step 404 captures snapshots of the video feed. For instance, snapshots of the video feed are captured as described with reference to FIG. 3. The method returns to step 400 and the video feed continues to be displayed as part of the communication session.

If the video feed does not meet the quality threshold ("No"), step 406 causes a snapshot to be displayed as part of the communication session in place of the video feed. For instance, the image capture module 126 communicates the snapshot 138 to the communication client 110 and/or the display device 114 for display during at least a portion of the communication session 132. In response to an indication that the video feed for the communication session 132 falls below a threshold quality, for example, the image capture module 126 causes the snapshot 138 to be displayed as the primary image 128 in place of the video feed. As referenced above, a video feed may fail to meet the quality threshold due the communication session 132 being dropped. In such a scenario, the snapshot 138 can be presented as the primary image 128 until the communication session 132 is reestablished and video feed of sufficient quality is received.

According to various implementations, the method returns to step 402 such that the quality of the video feed continues to be monitored. Thus, if the quality of the video data incoming to the client device 102 improves to meet the quality threshold, the method returns to step 400 such that the video feed replaces the snapshot for the communication session. Accordingly, techniques discussed herein may dynamically switch between displaying a live video feed and a snapshot in response to changing network conditions. Further, when video feed quality improves such that the video feed replaces the snapshot, further snapshots are automatically captured to replace previous (e.g., stale) snapshots.

Figure 5:
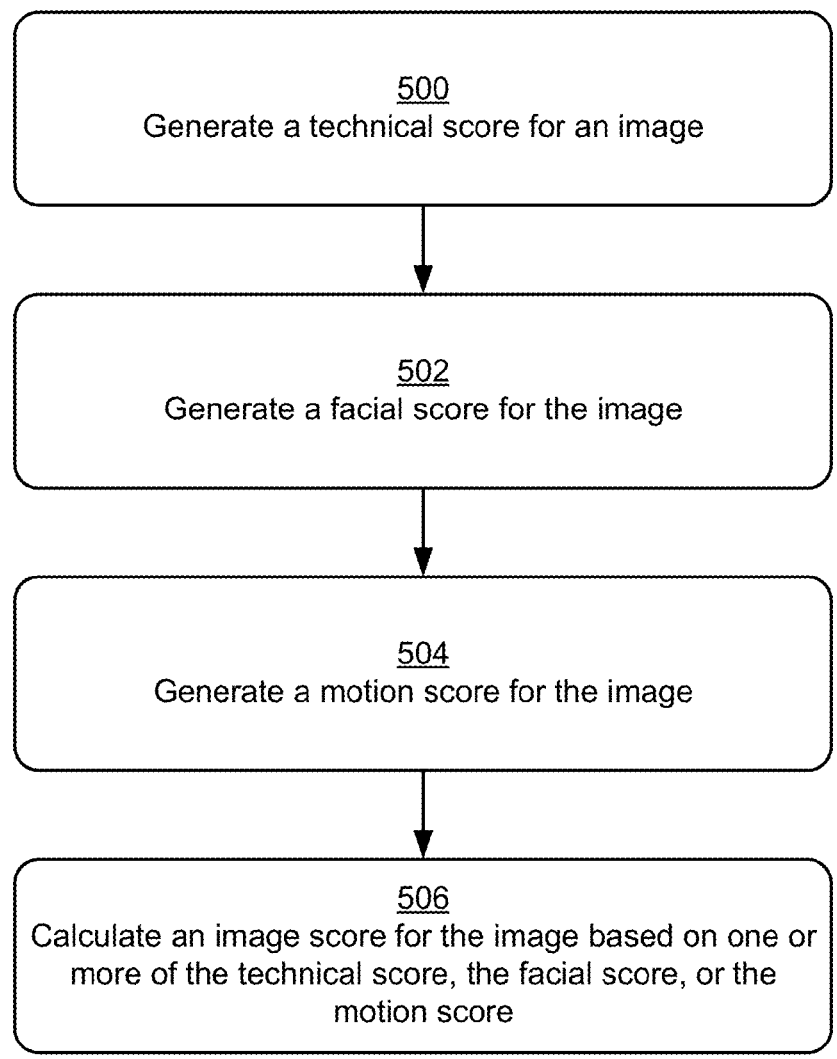
FIG. 5 is a flow diagram that describes steps in a method for scoring an image in accordance with one or more embodiments.

FIG. 5 is a flow diagram that describes steps in a method in accordance with one or more implementations. The method describes an example procedure for scoring an image in accordance with one or more implementations. The method, for example, represents an example way of performing step 304 of the method described above with reference to FIG. 3. In at least some implementations, the method may be performed at least in part at the client device 102 (e.g., by the image capture module 126) and/or by the communication service 124.

Step 500 generates a technical score for an image. Generally, the technical score relates to objective characteristics of the image, such as image resolution, image histogram characteristics, noise in the image, and so forth. For instance, a higher-resolution image may have a higher technical score than a lower resolution image. Further, image histogram characteristics may be scored, such as tonal distribution, white balance, contrast, and so forth.

A technical score may also consider the amount of noise present in an image. For instance, an image with a higher signal-to-noise ratio is given a higher technical score than an image with a lower signal-to-noise ratio.

Step 502 generates a facial score for the image. Generally, the facial score relates to attributes of an image of a face recognized within the image. For instance, with reference to the communication session 132 discussed above, the facial score relates to attributes of an image of a face of the user 134 in an image sampled from the video data 204 streamed from the endpoint device 118. An example way of generating a facial score is detailed below.

Step 504 generates a motion score for the image. The motion score, for instance, considers motion detected among adjacent images samples from a video feed. For example, motion refers to changes in displacement for a user detected in images sampled from a video feed, such as translational movement, rotational movement, and so forth. In an example implementation, an image in which less user movement is detected relative to a previously-sampled image is given a higher motion score than a different image in which more user movement is detected relative to a previously-sampled image.

Step 506 calculates an image score for the image based on one or more of the technical score, the facial score, or the motion score. For instance, two or more of the technical score, the facial score, or the motion score are added to generate the image score. Alternatively, a single instance of the technical score, the facial score, or the motion score is used as the image score.

Figure 6:
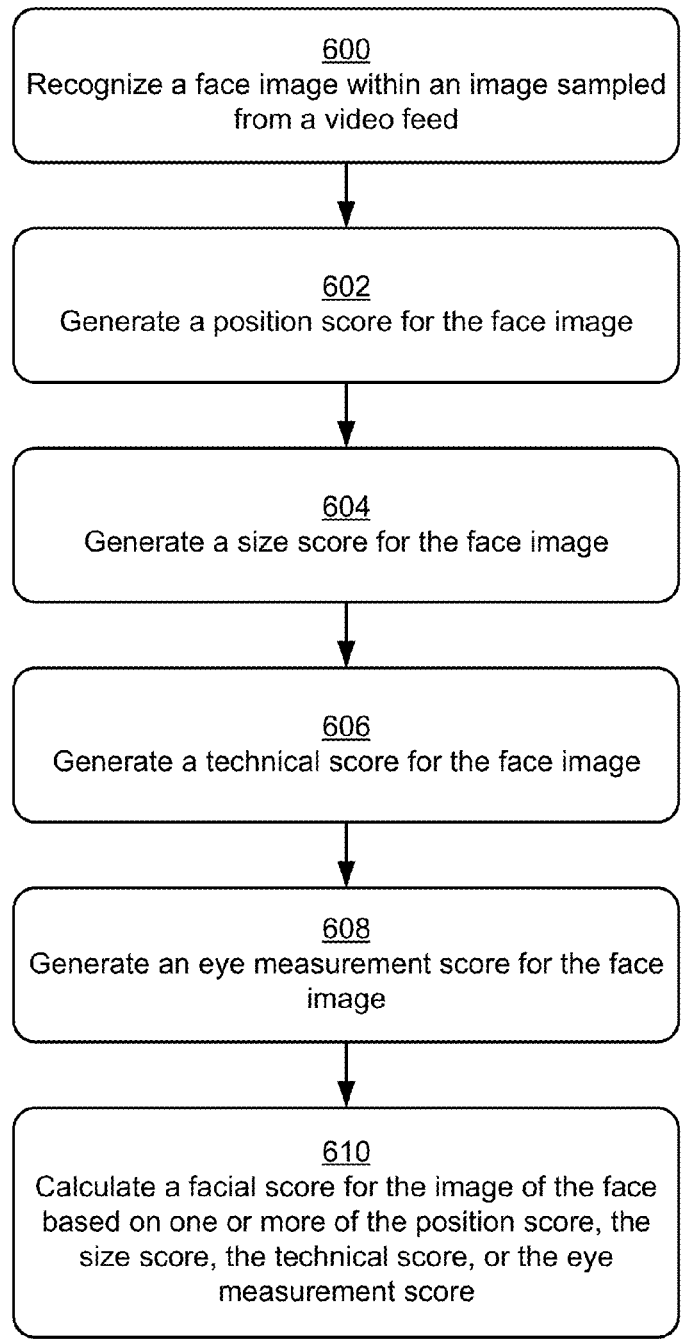
FIG. 6 is a flow diagram that describes steps in a method for generating a facial score for an image in accordance with one or more embodiments.

FIG. 6 is a flow diagram that describes steps in a method in accordance with one or more implementations. The method describes an example procedure for generating a facial score for an image in accordance with one or more implementations. The method, for example, represents an example way of performing step 502 of the method described above with reference to FIG. 5. In at least some implementations, the method may be performed at least in part at the client device 102 (e.g., by the image capture module 126) and/or by the communication service 124.

Step 600 recognizes a face image within an image sampled from a video feed. The image, for instance, is sampled as described above. Generally, the face image is identified using any suitable facial recognition technique.

Step 602 generates a position score for the face image. The position score, for instance, considers a position of the face image relative to a center of a frame in which the face image is detected. One example way of calculating a position score is detailed below.

Step 604 generates a size score for the face image. For example, the size score considers an area of the face image relative to a total area of an image (e.g., a frame) in which the face image is detected. Consider, for example, that an ideal relative size is defined, such as with reference to a percentage of a total image area covered by the face image. The ideal relative size, for instance, is defined as a percentage of the total image area, such as 50%. Thus, a face image with a size that is determined to be closer to the ideal relative size will have a higher size score than a face image with a size that is further from the ideal relative size. For instance, with reference to the example relative size mentioned above, a face image that is 49% of a total image area has a higher size score than a face image that is 38% of the total image area. This particular relative size is presented for purposes of example only, and it is to be appreciated that the ideal face image size may be defined in a variety of ways.

Step 606 generates a technical score for the face image. Generally, the technical score is based on objective image attributes of face image, such as tonal distribution, contrast, exposure, and so forth. For instance, a face image that falls within a pre-specified contrast range may have a higher technical score than an image that falls outside of the pre-specified contrast range. Further, a face image that appears over-exposed or under-exposed may have a lower technical score than an image that falls within a specified desirable exposure range.

Step 608 generates an eye measurement score for the face image. The eye measurement score, for example, quantifies an appearance of eye images detected in the face image as compared with an ideal eye appearance. For instance, eye images that appear open and looking forward will have a higher eye measurement score than eyes that are closed/partially closed and/or that are looking sideways or downward. An example way for calculating an eye measurement score is detailed below.

Step 610 calculates a facial score for the image of the face based on one or more of the position score, the size score, the technical score, or the eye measurement score. For instance, two or more of the position score, the size, score, the technical score, or the eye measurement score are added to generate the facial score. Alternatively, only one of the position score, the size, score, the technical score, or the eye measurement score is used for the facial score.

Figure 7:
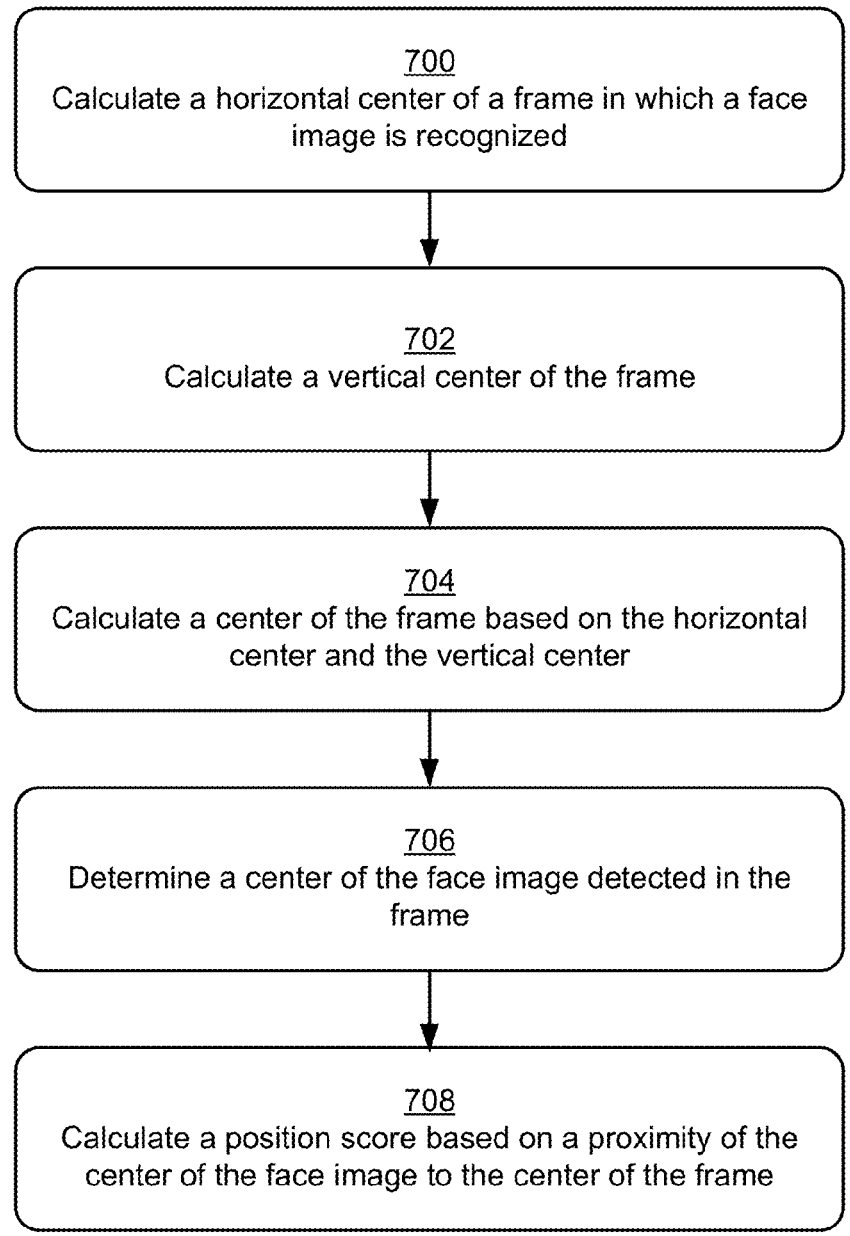
FIG. 7 is a flow diagram that describes steps in a method for generating a position score for a face image in accordance with one or more embodiments.

FIG. 7 is a flow diagram that describes steps in a method in accordance with one or more implementations. The method describes an example procedure for generating a position score for a face image in accordance with one or more implementations. The method, for example, represents an example way of performing step 602 of the method described above with reference to FIG. 6. In at least some implementations, the method may be performed at least in part at the client device 102 (e.g., by the image capture module 126) and/or by the communication service 124.

Step 700 calculates a horizontal center of a frame in which a face image is recognized. The frame, for instance, represents an image that is sampled from a video feed. For example, a horizontal center of the frame is calculated that corresponds to a center of the frame between a left edge and a right edge of the frame.

Step 702 calculates a vertical center of the frame. For instance, a vertical center of the frame is calculated that corresponds to a center of the frame between a top edge and a bottom edge of the frame.

Step 704 calculates a center of the frame based on the horizontal center and the vertical center. The frame center, for example, is calculated as a point where the horizontal center and the vertical center intersect.

Step 706 determines a center of the face image detected in the frame. For example, the center of the face image corresponds to a geometric center of the face image, e.g., a center of mass of the face image.

Step 708 calculates a position score based on a proximity of the center of the face image to the center of the frame. The position score can be calculated in various ways, such as based on a length of a straight line between the center of the face image and the center of the frame. For example, the position score in inversely proportional to the length of the straight line such that a face image with a shorter line between the center of the face image and the center of the frame has a higher position score than a different face image with a longer line between the center of the face image and the center of the frame.

Thus, the position score provides a way of quantifying how close a face image is to a visual center of frame. For instance, a face image that is closer to a frame center and thus has a higher position score may be considered to be more visually pleasing than a face image that is further from the frame center and thus has a lower position score.

Figure 8:
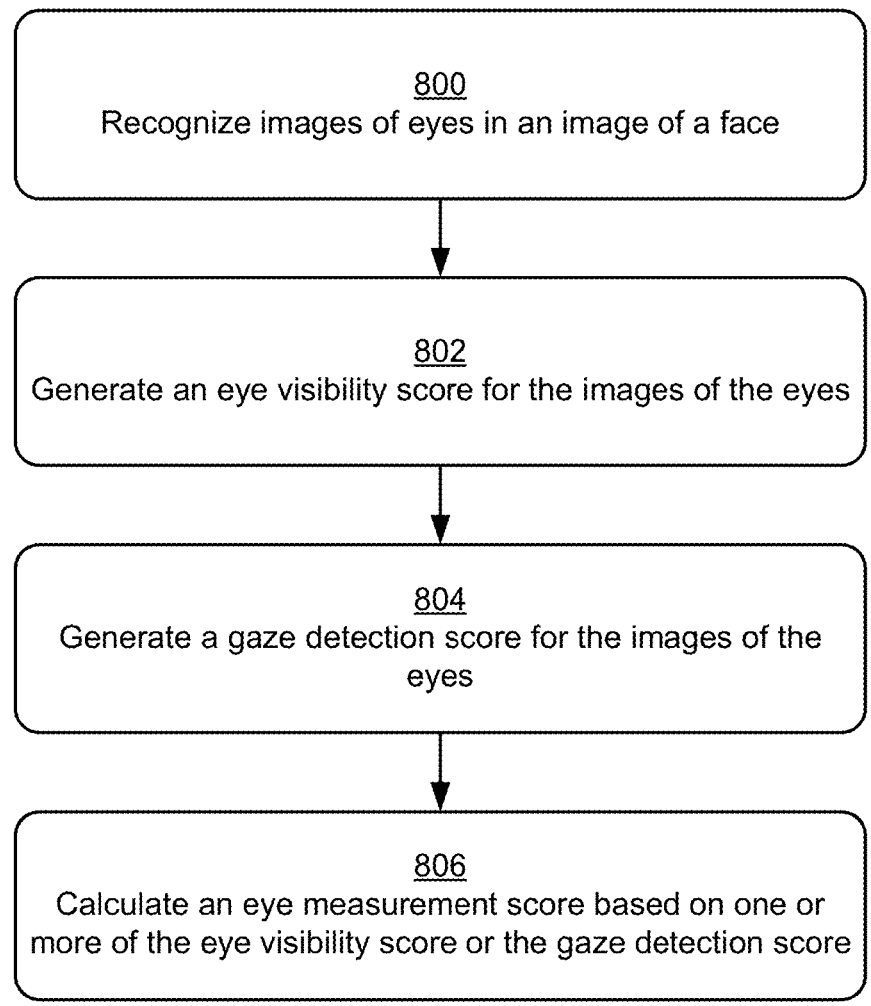
FIG. 8 is a flow diagram that describes steps in a method for generating an eye measurement score for an image of a face in accordance with one or more embodiments.

FIG. 8 is a flow diagram that describes steps in a method in accordance with one or more implementations. The method describes an example procedure for generating an eye measurement score for an image of a face in accordance with one or more implementations. The method, for example, represents an example way of performing step 608 of the method described above with reference to FIG. 6. In at least some implementations, the method may be performed at least in part at the client device 102 (e.g., by the image capture module 126) and/or by the communication service 124.

Step 800 recognizes images of eyes in an image of a face. Any suitable eye and/or facial recognition algorithm may be utilized to recognize the eye images.

Step 802 generates an eye visibility score for the images of the eyes. Generally, the eye visibility score indicates how much of the eye is visible relative to a total eye area. For instance, an eye that is closed will have a lower eye visibility score than an eye that is half-open, and an eye that is more than half-open will have a higher eye visibility score than an eye that is half open. An image of an eye that is captured when a user blinks, for example, will have a relatively low eye visibility score as compared with an image of an eye that appears open.

Step 804 generates a gaze detection score for the images of the eyes. Generally, the gaze detection score indicates a gaze direction of the images of the eyes. For instance, eye images that appear to be looking forward (e.g., into the camera 122) will have a higher gaze detection score than eye images that are looking elsewhere, such as sideways, downward, and so forth.

Step 806 calculates an eye measurement score based on one or more of the eye visibility score or the gaze detection score. The eye measurement score, for instance, is generated by adding the eye visibility score and the gaze detection score. Alternatively, the eye measurement score may be based on only one of the eye visibility score or the gaze detection score.

Figure 9:
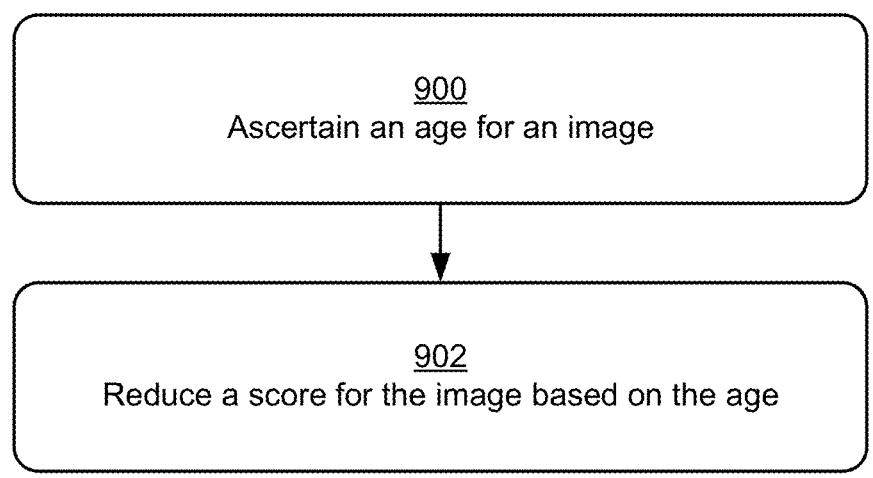
FIG. 9 is a flow diagram that describes steps in a method for reducing an image score for an image based on age of the image in accordance with one or more embodiments.

FIG. 9 is a flow diagram that describes steps in a method in accordance with one or more implementations. The method describes an example procedure for reducing an image score for an image based on age of the image in accordance with one or more implementations. The method, for example, represents an example way of weighting a snapshot score. In at least some implementations, the method may be performed at least in part at the client device 102 (e.g., by the image capture module 126) and/or by the communication service 124.

Step 900 ascertains an age of an image. As referenced above, for instance, an image is time stamped when it is initially sampled from a video feed and/or when a score for the image is calculated. Thus, an age for the image may be determined based on a difference between a current time and the timestamp for the image.

Step 902 reduces a score for the image based on the age. A reduction time interval, for example, is defined after which a score for an image is reduced by a pre-specified amount and/or percentage. For instance, a reduction time interval of 5 s is specified such that for every 5 s of age an image score is reduced by a particular number of points (e.g., 1 point) or a particular percentage, e.g., 5%.

Alternatively or additionally, scores for a group of images are all periodically reduced by a certain amount and/or percentage, such as every 5 s, every 10 s, and so forth.

Consider, for example, a scenario where a first image and a second image are initially given the same image score. However, the first image is older (e.g., 20 s older) than the second image, and thus the image score for the first image is reduced based on its age. Accordingly, the second image will have a higher score than the first image and thus will be given preference over the first image for snapshot selection.

According to implementations discussed herein, the procedures described above are automatically, periodically, and/or continuously performed during a communication session to capture images, score the images, and select snapshots based on the scored images. For instance, after a user initiates and or accepts an invitation to participate in a communication session, the procedures described above are automatically initiated without any further user interaction. Thus, a snapshot is selected that meets a variety of criteria such as quality and temporal criteria. Accordingly, techniques discussed herein provide a wide variety of scenarios and implementations for selecting a snapshot that can be utilized for a communication session.

Having discussed some example procedures, consider now a discussion of an example system and device in accordance with one or more embodiments.

Example System and Device

Figure 10:
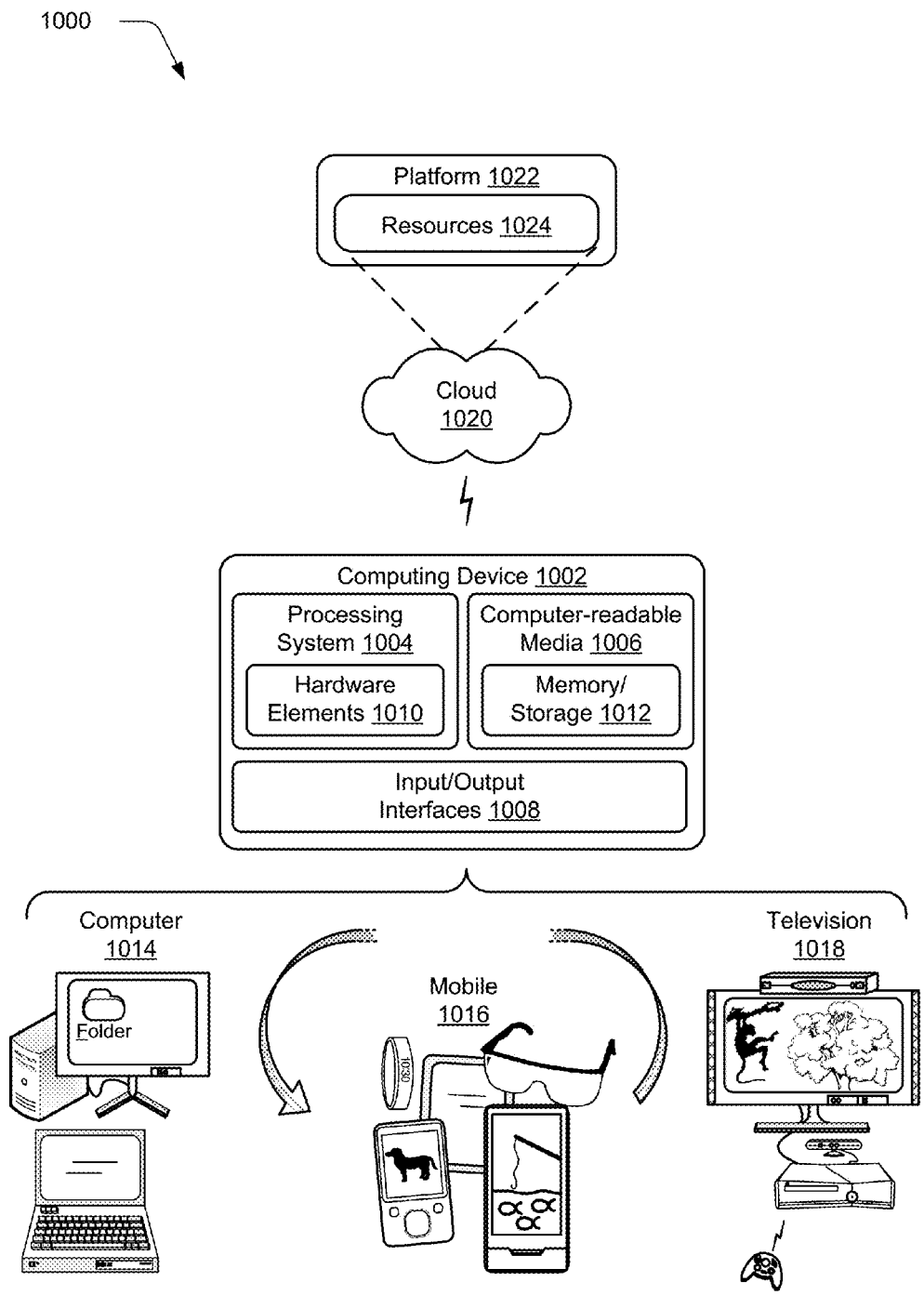
FIG. 10 illustrates an example system and computing device as described with reference to FIG. 1, which are configured to implement embodiments of techniques described herein.

FIG. 10 illustrates an example system generally at 1000 that includes an example computing device 1002 that is representative of one or more computing systems and/or devices that may implement various techniques described herein. For example, the client device 102, the endpoint device 118, and/or the communication service 124 discussed above with reference to FIG. 1 can be embodied as the computing device 1002. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more Input/Output (I/O) Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules that are executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a wearable device, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. For example, functionalities discussed with reference to the image capture module 126 and/or the communication service 124 may be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1

A system for causing a snapshot to be displayed as part of a communication session, the system including: at least one processor; and one or more computer-readable storage media including instructions stored thereon that, responsive to execution by the at least one processor, cause the system perform operations including: ascertaining that a video feed is established at a first device as part of a communication session between the first device and a second device; sampling the video feed to extract images of a participant in the communication session that is present at the second device; scoring the images to generate a score for each of the images; selecting a snapshot from the one or more images based on a score for the snapshot; and causing the snapshot to be displayed as part of the communication session in place of the video feed at the first device responsive to the video feed falling below a quality threshold.

Example 2

A system as recited in example 1, wherein said sampling and said selecting are performed automatically and independent of user interaction.

Example 3

A system as recited in one or more of examples 1 or 2, wherein the operations are performed at least in part at the first device.

Example 4

A system as recited in one or more of examples 1-3, wherein the operations are performed at least in part by a network-based service.

Example 5

A system as recited in one or more of examples 1-4, wherein said scoring for a particular image is based on one or more of a technical score for the particular image, a facial score for the particular image, or a motion score for the particular image.

Example 6

A system as recited in one or more of examples 1-5, wherein said scoring for a particular image is based at least in part on a facial score for a face image detected in the particular image, and wherein the facial score is generated based on one or more of a position score for the face image, a size score for the face image, a technical score for the face image, or an eye measurement score for the face image.

Example 7

A system as recited in one or more of examples 1-6, wherein said scoring for a particular image is based at least in part on a position score for a face image detected in the particular image, and wherein the position score is generated based on a proximity of a center of the face image to a center of the particular image.

Example 8

A system as recited in one or more of examples 1-7, wherein said scoring for a particular image is based at least in part on an eye measurement score for a face image detected in the particular image, and wherein the eye measurement score is generated based on an eye visibility score for one or more images of one or more eyes recognized in the face image.

Example 9

A system as recited in one or more of examples 1-8, wherein said scoring for a particular image is based at least in part on an eye measurement score for a face image detected in the particular image, and wherein the eye measurement score is generated based on a gaze detection score for one or more images of one or more eyes recognized in the face image.

Example 10

A system as recited in one or more of examples 1-9, wherein said scoring for a particular image is based at least in part on an age for the particular image.

Example 11

A system as recited in one or more of examples 1-10, wherein said scoring for a particular image includes: ascertaining an age for the particular image; and reducing an existing score for the particular image based on the age.

Example 12

A computer-implemented method for causing a snapshot to be displayed as part of a communication session, the method including: ascertaining that a video feed is established at a first device as part of a communication session between the first device and a second device; sampling by a computing system the video feed to extract one or more images of a participant in the communication session that is present at the second device; selecting by the computing system a snapshot from the one or more images based on one or more predefined criteria for the snapshot; and causing the snapshot to be displayed as part of the communication session in place of the video feed at the first device responsive to the video feed falling below a quality threshold.

Example 13

A method as described in example 12, wherein said sampling and said selecting are performed by the computing system automatically and independent of user interaction.

Example 14

A method as described in one or more of examples 12 or 13, wherein the one or more predefined criteria include one or more scoring criteria utilized to calculate an image score for the snapshot.

Example 15

A method as described in one or more of examples 12-14, wherein the one or more predefined criteria include one or more scoring criteria utilized to calculate an image score for the snapshot, and wherein the snapshot is selected based on the image score exceeding one or more other image scores for one or more other images.

Example 16

A method as described in one or more of examples 12-15, wherein the one or more predefined criteria include one or more scoring criteria utilized to calculate an image score for the snapshot, and wherein the one or more scoring criteria include one or more of a technical score for the snapshot, a facial score for the snapshot, or a motion score for the snapshot.

Example 17

A method as described in one or more of examples 12-16, wherein the one or more predefined criteria include one or more scoring criteria utilized to calculate an image score for the snapshot, and wherein the one or more scoring criteria include a gaze detection score generated for eyes of a face image recognized in the snapshot.

Example 18

A computer-implemented method for causing a snapshot to be displayed as part of a communication session, the method including: sampling a video feed of a communication session to extract one or more images of a participant in the communication session; selecting by a computing system a snapshot from the one or more images based on one or more predefined criteria for the snapshot; and causing the snapshot to be displayed as part of the communication session in place of the video feed responsive to the video feed falling below a quality threshold.

Example 19

A method as described in example 18, wherein said sampling and said selecting are performed automatically and independent of user interaction.

Example 20

A method as described in one or more of examples 18 or 19, further including: ascertaining, subsequent to said causing the snapshot to be displayed as part of the communication session in place of the video feed, that the video feed meets the quality threshold; causing the video feed to be displayed in place of the snapshot as part of the communication session; and resuming capturing one or more snapshots of the video feed.

CONCLUSION

Techniques for snapshot capture for a communication session are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   at least one processor; and
   one or more computer-readable storage media including instructions stored thereon that, responsive to execution by the at least one processor, cause the system to perform operations including:
   ascertaining that a video feed is established at a first device as part of a communication session between the first device and a second device;
   sampling the video feed to extract images of a participant in the communication session that is present at the second device;
   scoring the images to generate a score for each of the images;
   selecting a snapshot from the one or more images based on a score for the snapshot; and
   causing the snapshot to be displayed as part of the communication session in place of the video feed at the first device responsive to the video feed falling below a quality threshold.

2. A system as recited in claim 1, wherein said sampling and said selecting are performed automatically and independent of user interaction.

3. A system as recited in claim 1, wherein the operations are performed at least in part at the first device.

4. A system as recited in claim 1, wherein the operations are performed at least in part by a network-based service.

5. A system as recited in claim 1, wherein said scoring for a particular image is based on one or more of a technical score for the particular image, a facial score for the particular image, or a motion score for the particular image.

6. A system as recited in claim 1, wherein said scoring for a particular image is based at least in part on a facial score for a face image detected in the particular image, and wherein the facial score is generated based on one or more of a position score for the face image, a size score for the face image, a technical score for the face image, or an eye measurement score for the face image.

7. A system as recited in claim 1, wherein said scoring for a particular image is based at least in part on a position score for a face image detected in the particular image, and wherein the position score is generated based on a proximity of a center of the face image to a center of the particular image.

8. A system as recited in claim 1, wherein said scoring for a particular image is based at least in part on an eye measurement score for a face image detected in the particular image, and wherein the eye measurement score is generated based on an eye visibility score for one or more images of one or more eyes recognized in the face image.

9. A system as recited in claim 1, wherein said scoring for a particular image is based at least in part on an eye measurement score for a face image detected in the particular image, and wherein the eye measurement score is generated based on a gaze detection score for one or more images of one or more eyes recognized in the face image.

10. A system as recited in claim 1, wherein said scoring for a particular image is based at least in part on an age for the particular image.

11. A system as recited in claim 1, wherein said scoring for a particular image comprises:
    ascertaining an age for the particular image; and
    reducing an existing score for the particular image based on the age.

12. A computer-implemented method, comprising:
    ascertaining that a video feed is established at a first device as part of a communication session between the first device and a second device;
    sampling by a computing system the video feed to extract one or more images of a participant in the communication session that is present at the second device;
    selecting by the computing system a snapshot from the one or more images based on one or more predefined criteria for the snapshot; and
    causing the snapshot to be displayed as part of the communication session in place of the video feed at the first device responsive to the video feed falling below a quality threshold.

13. A method as described in claim 12, wherein said sampling and said selecting are performed by the computing system automatically and independent of user interaction.

14. A method as described in claim 12, wherein the one or more predefined criteria comprise one or more scoring criteria utilized to calculate an image score for the snapshot.

15. A method as described in claim 12, wherein the one or more predefined criteria comprise one or more scoring criteria utilized to calculate an image score for the snapshot, and wherein the snapshot is selected based on the image score exceeding one or more other image scores for one or more other images.

16. A method as described in claim 12, wherein the one or more predefined criteria comprise one or more scoring criteria utilized to calculate an image score for the snapshot, and wherein the one or more scoring criteria comprise one or more of a technical score for the snapshot, a facial score for the snapshot, or a motion score for the snapshot.

17. A method as described in claim 12, wherein the one or more predefined criteria comprise one or more scoring criteria utilized to calculate an image score for the snapshot, and wherein the one or more scoring criteria comprise a gaze detection score generated for eyes of a face image recognized in the snapshot.

18. A computer-implemented method, comprising:
sampling a video feed of a communication session to extract one or more images of a participant in the communication session;
selecting by a computing system a snapshot from the one or more images based on one or more predefined criteria for the snapshot; and
causing the snapshot to be displayed as part of the communication session in place of the video feed responsive to the video feed falling below a quality threshold.

19. A method as described in claim 18, wherein said sampling and said selecting are performed automatically and independent of user interaction.

20. A method as described in claim 18, further comprising:
ascertaining, subsequent to said causing the snapshot to be displayed as part of the communication session in place of the video feed, that the video feed meets the quality threshold;
causing the video feed to be displayed in place of the snapshot as part of the communication session; and
resuming capturing one or more snapshots of the video feed.

* * * * *